US012598536B2

(12) United States Patent
Wang et al.

(10) Patent No.: US 12,598,536 B2
(45) Date of Patent: Apr. 7, 2026

(54) MONITORING PROCEDURE FOR RELAY PATH SCENARIOS

(71) Applicant: Telefonaktiebolaget LM Ericsson (publ), Stockholm (SE)

(72) Inventors: Min Wang, Luleå (SE); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

(21) Appl. No.: 18/246,539

(22) PCT Filed: Oct. 1, 2021

(86) PCT No.: PCT/SE2021/050965
§ 371 (c)(1),
(2) Date: Mar. 24, 2023

(87) PCT Pub. No.: WO2022/071866
PCT Pub. Date: Apr. 7, 2022

(65) Prior Publication Data
US 2023/0397085 A1      Dec. 7, 2023

Related U.S. Application Data

(60) Provisional application No. 63/086,321, filed on Oct. 1, 2020.

(51) Int. Cl.
*H04W 40/34*      (2009.01)
*H04L 45/28*      (2022.01)
(Continued)

(52) U.S. Cl.
CPC ............. *H04W 40/34* (2013.01); *H04L 45/28* (2013.01); *H04W 24/04* (2013.01); *H04W 40/12* (2013.01); *H04W 40/22* (2013.01)

(58) Field of Classification Search
None
See application file for complete search history.

(56) References Cited

U.S. PATENT DOCUMENTS

2011/0217973 A1*  9/2011  Sagfors ................... H04L 69/32
                                                                   455/423
2015/0365872 A1* 12/2015  Dudda ............ H04W 36/00695
                                                                   455/436

(Continued)

OTHER PUBLICATIONS

PCT International Search Report and Written Opinion mailed Jan. 5, 2021 for International Application No. PCT/SE2021/050965, 10 pages.

(Continued)

*Primary Examiner* — Brian S Roberts
(74) *Attorney, Agent, or Firm* — Sage Patent Group

(57) ABSTRACT

A method, system and apparatus are disclosed for monitoring procedures for sidelink (SL) relay scenarios. A node determines an occurrence of at least one event associated with the relay path, the relay path including the node and the second node, and the at least one event including at least one of a warning event and a failure event for the relay path; and as a result of the determination, initiate performance of at least one action associated with the at least one of the warning event and the failure event.

19 Claims, 9 Drawing Sheets

(51) Int. Cl.
H04W 24/04 (2009.01)
H04W 40/12 (2009.01)
H04W 40/22 (2009.01)

(56) References Cited

U.S. PATENT DOCUMENTS

| | | | | |
|---|---|---|---|---|
| 2018/0070281 | A1 | 3/2018 | Wu et al. | |
| 2018/0302889 | A1 | 10/2018 | Guo et al. | |
| 2019/0150066 | A1* | 5/2019 | Suzuki | H04W 8/005 |
| | | | | 370/254 |
| 2020/0029384 | A1* | 1/2020 | Hong | H04W 36/305 |
| 2020/0052769 | A1* | 2/2020 | Cirik | H04B 7/0695 |
| 2020/0067762 | A1* | 2/2020 | Tang | H04B 7/155 |
| 2020/0229007 | A1* | 7/2020 | Jung | H04W 76/10 |
| 2021/0267002 | A1* | 8/2021 | Kung | H04W 76/14 |
| 2022/0095170 | A1* | 3/2022 | Lindoff | H04W 24/08 |

OTHER PUBLICATIONS

3GPP; Technical Specification Group Services and System Aspects; Study on system enhancement for Proximity based Services (ProSe) in the 5G System (5GS) (Release 17); 3GPP TR 23.752 V0.3.0 (Jan. 2020); 73 pages.

3GPP; Technical Specification Group Services and System Aspects; Proximity-based services (ProSe); Stage 2 (Release 16); 3GPP TS 23.303 V16.0.0 (Jul. 2020); 130 pages.

3GPP; Technical Specification Group Services and System Aspects; Architecture enhancements for 5G System (5GS) to support Vehicle-to-Everything (V2X) services (Release 16); 3GPP TS 23.287 V16.3.0 (Jul. 2020); 57 pages.

3GPP; Technical Specification Group Radio Access Network; Evolved Universal Terrestrial Radio Access (E-UTRA); Radio Resource Control (RRC); Protocol specification (Release 16); 3GPP TS 36.331 V16.1.1 (Jul. 2020); 1078 pages.

3GPP; Technical Specification Group Radio Access Network; Evolved Universal Terrestrial Radio Access (E-UTRA); User Equipment (UE) procedures in idle mode (Release 16); 3GPP TS 36.304 V16.1.0 (Jul. 2020); 63 pages.

3GPP; Technical Specification Group Radio Access Network; Evolved Universal Terrestrial Radio Access (E-UTRA); Requirements for support of radio resource management (Release 16); 3GPP TS 36.133 V16.6.0 (Jun. 2020); 3104 pages. (Submitted in 5 parts due to size).

ZTE Corp., Work Item on NR Small Data Transmissions in Inactive State, 3GPP TSG RAN Meeting #86, RP-193252, Sitges, Spain, Dec. 9-12, 2019, 4 pages.

First Examination Report for Indian Patent Application No. 202347015873, dated Oct. 6, 2023, 7 pages.

* cited by examiner

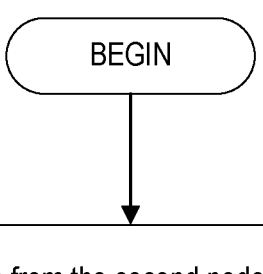

BEGIN

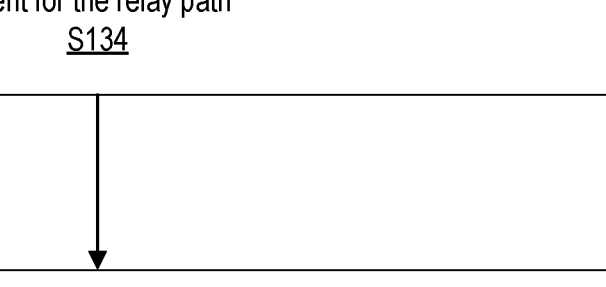

Receive a path status message from the second node in a relay path, the path status message being associated with an occurrence of at least one characteristic associated with the relay path, the relay path including the node and the second node, and the at least one characteristic corresponding to at least one of a warning event and a failure event for the relay path
S134

As a result of the path status message, initiate performance of at least one action associated with the at least one of the warning event and the failure event
S136

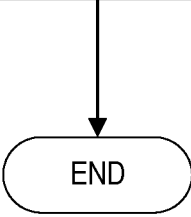

END

FIG. 9

MONITORING PROCEDURE FOR RELAY PATH SCENARIOS

CROSS-REFERENCE TO RELATED APPLICATIONS

This application is a 35 U.S.C § 371 national stage application for International Application No. PCT/SE2021/050965, entitled "MONITORING PROCEDURE FOR RELAY PATH SCENARIOS", filed on Oct. 1, 2021, which claims priority to U.S. Provisional Application No. 63/086,321, entitled "MONITORING PROCEDURE FOR SL RELAY SCENARIOS", filed on Oct. 1, 2020 assigned to the assignee hereof, and expressly incorporated herein by reference.

FIELD

The present disclosure relates to wireless communications, and in particular, to monitoring procedure for relay path scenarios, such as, e.g., sidelink (SL) relay scenarios.

BACKGROUND

Similar to Third Generation Partnership Project (3GPP) Long Term Evolution (LTE), 3GPP New Radio (NR, also called 5th Generation or 5G) uses OFDM (Orthogonal Frequency Division Multiplexing) in the downlink (i.e., from a network node, gNB, eNB, or base station, to a wireless device (WD), also called user equipment or UE). The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one orthogonal frequency-division multiplexing (OFDM) subcarrier during one OFDM symbol interval.

Different subcarrier spacing values are supported in NR. The supported subcarrier spacing values (also referred to as different numerologies) are given by $\Delta f = (15 \times 2^{\hat{}}\mu)$ kHz where $\mu \in (0,1,2,3,4)$. $\Delta f = 15$ kHz is the basic (or reference) subcarrier spacing that is also used in LTE.

In the time domain, downlink and uplink transmissions in NR may be organized into equally-sized subframes of 1 ms each similar to LTE. A subframe is further divided into multiple slots of equal duration. The slot length for subcarrier spacing $\Delta f = (15 \times 2^{\hat{}}\mu)$ kHz is $\frac{1}{2}^{\hat{}}\mu$ ms. There is only one slot per subframe for $\Delta f = 15$ kHz and a slot includes 14 OFDM symbols.

Downlink transmissions are dynamically scheduled, i.e., in each slot the gNB transmits downlink control information (DCI) about which WD data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A WD first detects and decodes PDCCH and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including SSB, CSI-RS, etc.

Uplink data transmissions, carried on Physical Uplink Shared Channel (PUSCH), can also be dynamically scheduled by the gNB by transmitting a DCI, the DCI (which is transmitted in the DL region) always indicates a scheduling time offset so that the PUSCH is transmitted in a slot in the UL region.

Sidelink Transmissions in NR

Sidelink transmissions over NR are specified for 3GPP Release (Rel 16). These are enhancements of the ProSe (PROximity-based SErvices) specified for LTE. Four new enhancements are particularly introduced to NR sidelink transmissions as follows:

Support for unicast and groupcast transmissions are added in NR sidelink. For unicast and groupcast, the physical sidelink feedback channel (PSFCH) is introduced for a receiver WD to reply the decoding status to a transmitter WD.

Grant-free transmissions, which are adopted in NR uplink transmissions, are also provided in NR sidelink transmissions, to improve the latency performance.

To alleviate resource collisions among different sidelink transmissions launched by different WDs, it enhances channel sensing and resource selection procedures, which also lead to a new design of PSCCH (physical sidelink common control channel).

To achieve a high connection density, congestion control and thus the Quality-of-Service (QoS) management is supported in NR sidelink transmissions.

To enable the above enhancements, new physical channels and reference signals are introduced in NR (available in LTE before):

PSSCH (Physical Sidelink Shared Channel, SL version of PDSCH): The PSSCH is transmitted by a sidelink transmitter WD, which conveys sidelink transmission data, system information blocks (SIBs) for radio resource control (RRC) configuration, and a part of the sidelink control information (SCI).

PSFCH (Physical Sidelink, SL version of PUCCH): The PSFCH is transmitted by a sidelink receiver WD for unicast and groupcast, which conveys 1 bit information over 1 RB for the HARQ acknowledgement (ACK) and the negative ACK (NACK). In addition, channel state information (CSI) is carried in the medium access control (MAC) control element (CE) over the PSSCH instead of the PSFCH.

PSCCH (Physical Sidelink Common Control Channel, SL version of PDCCH): When the traffic to be sent to a receiver WD arrives at a transmitter WD, a transmitter WD may first send the PSCCH, which conveys a part of SCI (Sidelink Control information, SL version of DCI) to be decoded by any WD for the channel sensing purpose, including the reserved time-frequency resources for transmissions, demodulation reference signal (DMRS) pattern and antenna port, etc.

Sidelink Primary/Secondary Synchronization Signal (S-PSS/S-SSS): Similar to downlink transmissions in NR, in sidelink transmissions, primary and secondary synchronization signals (called S-PSS and S-SSS, respectively) are supported. Through detecting the S-PSS and S-SSS, a WD is able to identify the sidelink synchronization identity (SSID) from the WD sending the S-PSS/S-SSS. Through detecting the S-PSS/S-SSS, a WD is therefore able to know the characteristics of the WD transmitter the S-PSS/S-SSS. A series of process of acquiring timing and frequency synchronization together with SSIDs of WDs is called initial cell search. Note that the WD sending the S-PSS/S-SSS may not be necessarily involved in sidelink transmissions, and a node (WD/eNB/gNB) sending the S-PSS/S-SSS is called a synchronization source. There are 2 S-PSS sequences and 336 S-SSS sequences forming a total of 672 SSIDs in a cell.

Physical Sidelink Broadcast Channel (PSBCH): The PSBCH is transmitted along with the S-PSS/S-SSS as a synchronization signal/PSBCH block (SSB). The SSB has the same numerology as PSCCH/PSSCH on that carrier, and an SSB may be transmitted within the bandwidth of the configured bandwidth part (BWP). The PSBCH conveys information related to synchronization, such as the direct frame number (DFN), indication of the slot and symbol level time resources for sidelink transmissions, in-coverage indicator, etc. The SSB is transmitted periodically at every 160 ms.

DMRS, phase tracking reference signal (PT-RS), channel state information reference signal (CSIRS): These physical reference signals supported by NR downlink/uplink transmissions are also adopted by sidelink transmissions. Similarly, the PT-RS is only applicable for Frequency 2 (FR2) transmission.

Another new feature is the two-stage sidelink control information (SCI). This a version of the DCI for SL. Unlike the DCI, only part (first stage) of the SCI is sent on the PSCCH. This part is used for channel sensing purposes (including the reserved time-frequency resources for transmissions, demodulation reference signal (DMRS) pattern and antenna port, etc.) and can be read by all WDs while the remaining (second stage) scheduling and control information such as a 8-bits source identity (ID) and a 16-bits destination identifier (ID), new data indicator (NDI), redundancy version (RV) and hybrid automatic repeat request (HARQ) process ID is sent on the PSSCH to be decoded by the receiver WD.

Similar as for PRoSE in LTE, NR sidelink transmissions have the following two modes of resource allocations:

Mode 1: Sidelink resources are scheduled by a gNB.

Mode 2: The WD autonomously selects sidelink resources from a (pre-)configured sidelink resource pool(s) based on the channel sensing mechanism.

For the in-coverage WD, a gNB can be configured to adopt Mode 1 or Mode 2. For the out-of-coverage WD, only Mode 2 can be adopted.

As in LTE, scheduling over the sidelink in NR is done in different ways for Mode 1 and Mode 2.

Mode 1 Supports the Following Two Kinds of Grants:

Dynamic grant: When the traffic to be sent over sidelink arrives at a transmitter WD, this WD may launch the four-message exchange procedure to request sidelink resources from a gNB (scheduling request (SR) on uplink (UL), grant, buffer status report (BSR) on UL, grant for data on SL sent to WD). During the resource request procedure, a gNB may allocate a sidelink radio network temporary identifier (SL-RNTI) to the transmitter WD. If this sidelink resource request is granted by a gNB, then a gNB indicates the resource allocation for the PSCCH and the PSSCH in the downlink control information (DCI) conveyed by PDCCH with cyclic redundancy check (CRC) scrambled with the SL-RNTI. When a transmitter WD receives such a DCI, a transmitter WD can obtain the grant only if the scrambled CRC of DCI can be successfully solved by the assigned SL-RNTI. A transmitter WD then indicates the time-frequency resources and the transmission scheme of the allocated PSSCH in the PSCCH, and launches the PSCCH and the PSSCH on the allocated resources for sidelink transmissions. When a grant is obtained from a gNB, a transmitter WD can only transmit a single transport block (TB). As a result, this kind of grant is suitable for traffic with a loose latency requirement.

Configured grant: For the traffic with a strict latency requirement, performing the four-message exchange procedure to request sidelink resources may induce unacceptable latency. In this case, prior to the traffic arrival, a transmitter WD may perform the four-message exchange procedure and request a set of resources. If a grant can be obtained from a gNB, then the requested resources are reserved in a periodic manner. Upon traffic arriving at a transmitter WD, this WD can launch the PSCCH and the PSSCH on the upcoming resource occasion. In fact, this kind of grant is also known as grant-free transmissions.

In both dynamic grant and configured grant, a sidelink receiver WD cannot receive the DCI (since it is addressed to the transmitter WD), and therefore a receiver WD may perform blind decoding to identify the presence of PSCCH and find the resources for the PSSCH through the SCI.

When a transmitter WD launches the PSCCH, CRC is also inserted in the SCI without any scrambling.

Mode 2

In the Mode 2 resource allocation, when traffic arrives at a transmitter WD, this transmitter WD may autonomously select resources for the PSCCH and the PSSCH. To further minimize the latency of the feedback HARQ acknowledgements/non-acknowledged (ACK/NACK) transmissions and subsequently retransmissions, a transmitter WD may also reserve resources for PSCCH/PSSCH for retransmissions. To further enhance the probability of successful TB decoding at one shot and thus suppress the probability to perform retransmissions, a transmitter WD may repeat the TB transmission along with the initial TB transmission. This mechanism is also known as blind retransmission. As a result, when traffic arrives at a transmitter WD, then this transmitter WD may select resources for the following transmissions:

1) The PSSCH associated with the PSCCH for initial transmission and blind retransmissions.

2) The PSSCH associated with the PSCCH for retransmissions.

Since each transmitter WD in sidelink transmissions may autonomously select resources for above transmissions, how to prevent different transmitter WDs from selecting the same resources turns out to be an important issue in Mode 2. A particular resource selection procedure is therefore imposed to Mode 2 based on channel sensing. The channel sensing algorithm involves measuring reference signal received power (RSRP) on different subchannels and requires knowledge of the different WDs power levels of DMRS on the PSSCH or the DMRS on the PSCCH depending on the configuration. This information is known only after receiver SCI launched by (all) other WDs. The sensing and selection algorithm is rather complex.

Discovery Procedures

There are device-to-device (D2D) discovery procedures for detection of services and applications offered by other WDs in close proximity. This is part of LTE 3GPP Release 12 (Rel 12) and 3GPP Release 13 (Rel 13). The discovery procedure has two modes, mode A based on open announcements (broadcasts) and mode B, which is request/response. The discovery mechanism is controlled by the application layer (ProSe). The discovery message is sent on the Physical Sidelink Discovery Channel (PSDCH) which is not available in NR. Also, there is a specific resource pool for announcement and monitoring of discovery messages. The discovery procedure can be used to detect WDs supporting certain services or applications before initiating direct communication.

NR 3GPP Release 17 (Rel 17) Sidelink

In 3GPP Rel 17, National Security and Public Safety (NSPS) is considered to be one important use case, which can benefit from the already developed NR sidelink features in 3GPP Rel 16. Therefore, it is most likely that 3GPP may specify enhancements related to the NSPS use case, taking NR Rel 16 sidelink communications as a baseline. Further, in some scenarios NSPS services may operate with partial or even without any network (NW) coverage, such as indoor firefighting, forest firefighting, earthquake rescue, sea rescue, etc., where the infrastructure is (partially) destroyed or not available; therefore, coverage extension may be a crucial enabler for NSPS, for both NSPS services communicated between WDs, and the cellular NW and that communicate between WDs over sidelink. In 3GPP Rel 17, a new study item description (SID) on NR sidelink relay (RP-193253) is launched which aims to further explore coverage extension for sidelink-based communication, including both WD to NW relay for cellular coverage extension and WD to WD relay for sidelink coverage extension.

L1/L2 ID

Sidelink transmissions are associated with a source L1/L2 ID and a destination L1/L2 ID.

For sidelink unicast, source L1/L2 ID represents the service type and/or transmitter WD ID, which may become the destination L1/L2 ID of the peer WD. A sidelink unicast link is identified by the combination of source L1/L2 ID and destination L1/L2 ID.

For sidelink groupcast, source L1/L2 ID represents the transmitter WD ID, and destination L1/L2 ID represents the group identifier provided by the upper layer or the service type.

For sidelink broadcast, source L1/L2 ID represents the transmitter WD ID, and destination L1/L2 ID represents the service type.

A connected WD may report the destination L2 ID to its serving cell/node.

ProSe Direct Discovery

As described in clause 6.1 of 3GPP Technical Report (TR) 23.752 version (V) 0.3.0 (hereinafter "TR 23.752"), the discovery procedure which is being studied for 3GPP NR Rel 17 is based on 3GPP 5G Core (5GC) architecture, including authorization and provision, announcing and monitoring procedures, and protocol for discovery as detailed in clause 6.1.2 of TR 23.752.

In 3GPP Evolved Packet System (EPS), there are two types of ProSe Direct Discovery: open and restricted. Open discovery is the case where there is no explicit permission that is required from the WD being discovered, whereas restricted discovery only takes place with explicit permission from the WD that is being discovered.

There are two models for ProSe Direct Discovery existing in EPS: Model A and Model B. And the definition for Model A and Model B is as defined in clause 5.3.1.2 of 3GPP Technical Specification (TS) 23.303 V 16.0.0, (hereinafter "TS 23.303").

Procedures for Discovery

For the direct discovery authorization and provision to the WD, it is expected the application function (AF) can provide the groups and/or service information to the policy control function (PCF) via network exposure function (NEF) and the PCF provides the authorization to the WD according to the received information from the AF. The authorization and provision procedures in clauses 6.2.2 and 6.2.5 of 3GPP Technical Specification (TS) 23.287 V 16.3.0, (hereinafter "TS 23.287") are reused to provide at least the following configurations:

1) The AF request sent to the PCF (or via NEF) contains the information as below:

The service information to be directly discovered over PC5 interface. The service information can contain, e.g., Application Identifier (ID);

The group information (e.g., the external group identifier) to be directly discovered over PC5 interface;

The information can per announcing and monitoring direction for Model A or per discoverer WD and discoveree WD for Model B;

The area information, e.g., geographical information (longitude/latitude, zip code, etc.).

It is for further study (FFS) whether and how to configure the metadata information to the WD and what is the size of meta data that can be efficiently sent as part of discovery over PC5.

2) The provision to the WD from PCF, contains the following information based on the information received from the AF and local policy:

The service information to be directly discovered over PC5 interface. The service information can contain, e.g., Application ID;

The group information (e.g., the external group identifier) to be directly discovered over PC5 interface;

The area information used for direct discovery over PC5 interface; the area information could be geographical TA list. It is expected PCF may map the area information provided by AF to a list of tracking areas (TAs).

Security parameters used for direct discovery over PC5.

NOTE: Uu radio access technology (RAT) restriction is not applied to PC5 operations for the WD. Uu RAT information is not needed to be provisioned in the WD, e.g., to authorize the WD to send or monitor direct discovery message only when the WD camps on NR.

If the access and mobility management function (AMF) determines the WD is authorized to use direct discovery based on the authorized area information, the AMF provides the WD is authorized to use direct discovery over PC5 interface to corresponding Next Generation Radio Access Network (NG-RAN) during N2 establishment for the WD.

The user may obtain ProSe application user ID and ProSe application code for ProSe direct discovery using application layer mechanisms. The application layer in the WD provides application user ID and the application identifier to the ProSe Application Function.

The ProSe Application Function (AF) allocates a ProSe application user ID and ProSe application code to the application layer in the WD.

FIG. 2 illustrates an example of FIG. 6.1.2.2-1 (procedure for discovery procedure) in 3GPP TS 23.752, such as follows:

NOTE: Step 0 is out of this specification, and this step is only used for the applications for which there is a privacy issue.

1. The WD obtains the authorization and provision for announcing discovery and/or for monitoring/solicitation discovery as defined in clauses 6.2.2 and 6.2.5 of 3GPP TS 23.287.

2a. When the announcing WD is triggered e.g., by an upper layer application to announce availability for interested groups and/or for interested applications, if the WD is authorised to perform the announcing WD procedure for the interested groups and/or the interested applications in step 1, then the WD may generate a PC5 direct discovery message for announcement and includes the following information in this message. The announcing WD computes a security protection element (e.g., for integrity protection) and appends it to the PC5 message:

1) ProSe WD ID, e.g., ProSe application user ID, Layer 2 ID.

2) The group ID(s) provided by the application layer.

3) The application ID(s) or ProSe application code(s) provided the application layer.

When the monitoring WD is triggered e.g., by an upper layer application or by the user to monitor proximity of other WDs for the interested group(s) and/or interested applications, and if the WD is authorised to perform the monitoring procedure for the group(s) and/or applications, then the WD monitors the discovery message. The monitoring WD verifies the security protection element using the provisioned security parameters corresponding to the application. If the verification of the security protection element succeeds, the service is successfully discovered by the monitoring WD. The monitoring WD may then notify the application layer using the result of the discovery.

2b. When the discoverer WD is triggered, e.g., by an upper layer application or by the user to discover other WDs for the interested group(s) and/or interested applications, and if the WD is authorised to perform the discovery solicitation procedure for the group(s) and/or applications in step 1, then the WD sends solicitation message with the information of discoverer ProSe WD ID, application ID(s) or ProSe application code(s), group ID(s). The discoverer WD computes a security protection element (e.g., for integrity protection) and appends it to the PC5 message.

If the discoveree WD is able to and authorised to respond to the discovery solicitation according to the received information in the solicitation message, then it responds to the discovery message with the discoveree ProSe WD ID, the supported application ID(s) or ProSe application code(s) and group ID(s).

3a. If the monitoring WD/discoverer WD wants to request metadata corresponding to the discovered service in step 2, the monitoring WD/discoverer WD may send a unicast metadata request message to request discovery metadata. The monitoring WD/discoverer WD may use the Layer 2 ID of announcing WD/discoveree WD (received in step 2a or 2b) to send the Metadata Request message.

3b. The announcing WD/discoveree WD responds with the Metadata Response message. The announcing WD/discoveree WD includes the metadata information in the Metadata Response message.

Relay WD (Re)Selection

In LTE a coverage based relay WD (re)selection is introduced, a remote WD performs relay WD (re)selection only when the measured Uu channel quality and/or SL channel quality to the current linked relay WD becomes bad, e.g., the measured channel quality becomes below than a configured threshold. The detailed procedure is defined in clause 5.10.11.4 in 3GPP TS 36.331 V 16.1.1 (hereinafter "TS 36.331") and is reproduced below:

A WD capable of sidelink remote WD operation that is configured by upper layers to search for a sidelink relay WD may:

1> if out of coverage on the frequency used for sidelink communication, as defined in 3GPP TS 36.304, V 16.1.0 (hereinafter "TS 36.304"), clause 11.4; or 1> if the serving frequency is used for sidelink communication and the RSRP measurement of the cell on which the WD camps (RRC_IDLE)/the PCell (RRC_CONNECTED) is below threshHigh within remote UE-Config:

2> search for candidate sidelink relay WDs, in accordance with 3GPP TS 36.133, V 16.6.0 (hereinafter "TS 36.133")

2> when evaluating the one or more detected sidelink relay WDs, apply layer 3 filtering as specified in 5.5.3.2 across measurements that concern the same ProSe Relay WD ID and using the filterCoefficient in SystemInformationBlockType19 (in coverage) or the preconfiguredfilterCoefficient as defined in 9.3(out of coverage), before using the SD-RSRP measurement results;

NOTE 1: The details of the interaction with upper layers are up to WD implementation.

2> if the WD does not have a selected sidelink relay WD:

3> select a candidate sidelink relay WD which SD-RSRP exceeds q-RxLevMin included in either reselectionInfoIC (in coverage) or reselectionInfoOoC (out of coverage) by minHyst;

2> else if SD-RSRP of the currently selected sidelink relay WD is below q-RxLevMin included in either reselectionInfoIC (in coverage) or reselectionInfoOoC (out of coverage); orif upper layers indicate not to use the currently selected sidelink relay: (i.e., sidelink relay WD reselection):

3> select a candidate sidelink relay WD which SD-RSRP exceeds q-RxLevMin included in either reselectionInfoIC (in coverage) or reselectionInfoOoC (out of coverage) by minHyst;

2> else if the WD did not detect any candidate sidelink relay WD which SD-RSRP exceeds q-RxLevMin included in either reselectionInfoIC (in coverage) or reselectionInfoOoC (out of coverage) by minHyst:

3> consider no sidelink relay WD to be selected;

NOTE 2: The WD may perform sidelink relay WD reselection in a manner resulting in selection of the sidelink relay WD, amongst all candidate sidelink relay WDs meeting higher layer criteria, that has the best radio link quality. Further details, including interaction with upper layers, are up to WD implementation.

SUMMARY

Some embodiments advantageously provide methods, systems, and apparatuses for monitoring procedure for sidelink (SL) relay scenarios.

In one embodiment, a node (e.g., monitoring node) is configured to determine an occurrence of at least one characteristic associated with a relay path, the relay path including the node and the second node, and the at least one characteristic corresponding to at least one of a warning event and a failure event for the relay path; as a result of the determination, initiate performance of at least one action associated with the at least one of the warning event and the failure event.

In one embodiment, a node (e.g., relay node, remote/destination node) is configured to receive a path status message from the second node in a relay path, the path status message being associated with an occurrence of at least one characteristic associated with the relay path, the relay path including the node, and the second node and the at least one characteristic corresponding to at least one of a warning event and a failure event for the relay path; and as a result of the path status message, initiate performance of at least one action associated with the at least one of the warning event and the failure event.

According to an aspect of the present disclosure, a method implemented in a node configured to communicate with a second node over a relay path is provided. The method comprises determining an occurrence of at least one event associated with the relay path, the relay path including the node and the second node, and the at least one event comprising at least one of a warning event and a failure event for the relay path; and as a result of the determination, initiating performance of at least one action associated with the at least one of the warning event and the failure event.

In some embodiments, the relay path comprises at least one of a sidelink, SL, path, a wireless device-to-network relay path and a wireless device-to-wireless device relay path. In some embodiments, the determining the occurrence of the at least one event associated with the relay path comprises at least one of: (i) detecting the occurrence of the at least one event on the relay path; and (ii) receiving a path status message indicating the occurrence of the at least one event on the relay path. In some embodiments, the initiating the performance of the at least one action comprises sending a path status message indicating the occurrence of the at least one event on the relay path. In some embodiments, the path status message indicates the occurrence of the at least one event on a single hop of the relay path.

In some embodiments, the path status message indicates the occurrence of the at least one event on all hops along the relay path and the path status message further comprises an indication to forward the path status message along all nodes in the relay path. In some embodiments, the path status message comprising at least one of: a node identifier, ID, an event ID, a hop ID, whether the event is associated with a relay traffic, a flow ID associated with the event, a radio bearer associated with the event and a logical channel ID associated with the event. In some embodiments, the initiating the performance of the at least one action comprises initiating a recovery procedure to avoid the at least one of the warning event and the failure event. In some embodiments, the recovery procedure comprises releasing the relay path.

In some embodiments, the recovery procedure comprises selecting another relay path and switching from the relay path to the another relay path. In some embodiments, the recovery procedure comprises switching from the relay path to a predetermined default relay path. In some embodiments, the recovery procedure comprises changing at least one hop along the relay path that is associated with the at least one of the warning event and the failure event. In some embodiments, the recovery procedure comprises remapping at least one of a flow, a service, a radio link channel, a logical channel that is associated with the at least one of the warning event and the failure event on the relay path. In some embodiments, the recovery procedure comprises allocating additional resources to the relay path.

In some embodiments, the recovery procedure to initiate as a result of the occurrence of the at least one event is configured via at least one of a system information signaling, a radio resource control, RRC, signaling, a medium access control, MAC, control element, CE, signaling and a downlink control information, DCI, signaling. In some embodiments, the determining the occurrence of the at least one event associated with the relay path comprises determining the occurrence of at least one Quality-of-Service, QoS, requirement not being met on at least one hop in the relay path. In some embodiments, the determining the occurrence of the at least one event associated with the relay path comprises determining that at least one radio channel quality indicator on at least one hop in the relay path is below a predetermined threshold.

In some embodiments, the determining the occurrence of the at least one event associated with the relay path comprises determining that a number of retransmissions on at least one hop in the relay path reached a predetermined maximum number. In some embodiments, the determining the occurrence of the at least one event associated with the relay path comprises determining that a procedure on at least one hop in the relay path reached a predetermined maximum time delay before being completed. In some embodiments, the determining the occurrence of the at least one event associated with the relay path comprises determining that a maximum number of non-acknowledgements, NACKs, reached a predetermined maximum number. In some embodiments, the determining the occurrence of the at least one event associated with the relay path comprises determining that a maximum number of discontinuous transmissions, DTXs, reached a predetermined maximum number.

In some embodiments, the method further includes receiving a configuration to monitor for the occurrence of the at least one event associated with the relay path via at least one of a radio resource control, RRC, signaling, a PC5-RRC signaling, a system information block signaling. In some embodiments, the node is pre-configured to monitor for the occurrence of the at least one event associated with the relay path. In some embodiments, the method further includes indicating a capability to monitor the relay path. In some embodiments, the node is one of a wireless device and a network node; and the second node is one of a destination node and a relay node on the relay path.

According to another aspect of the present disclosure, a node configured to communicate with a second node over a relay path is provided. The node comprises processing circuitry. The processing circuitry is configured to cause the node to determine an occurrence of at least one event associated with the relay path, the relay path including the node and the second node, and the at least one event comprising at least one of a warning event and a failure event for the relay path; and as a result of the determination, initiate performance of at least one action associated with the at least one of the warning event and the failure event.

In some embodiments, the relay path comprises at least one of a sidelink, SL, path, a wireless device-to-network relay path and a wireless device-to-wireless device relay path. In some embodiments, the processing circuitry is configured to cause the node to determine the occurrence of the at least one event associated with the relay path by being configured to cause the node to at least one of: (i) detect the occurrence of the at least one event on the relay path; and (ii) receive a path status message indicating the occurrence of the at least one event on the relay path. In some embodiments, the processing circuitry is configured to cause the node to initiate the performance of the at least one action by being configured to cause the node to send a path status message indicating the occurrence of the at least one event on the relay path.

In some embodiments, the path status message indicates the occurrence of the at least one event on a single hop of the relay path. In some embodiments, the path status message indicates the occurrence of the at least one event on all hops along the relay path and the path status message further comprises an indication to forward the path status message along all nodes in the relay path. In some embodiments, the path status message comprises at least one of: a node identifier, ID, an event ID, a hop ID, whether the event is associated with a relay traffic, a flow ID associated with the event, a radio bearer associated with the event and a logical channel ID associated with the event.

In some embodiments, the processing circuitry is config-ured to cause the node to initiate the performance of the at least one action by being configured to cause the node to initiate a recovery procedure to avoid the at least one of the warning event and the failure event. In some embodiments, the recovery procedure comprises releasing the relay path. In some embodiments, the recovery procedure comprises selecting another relay path and switching from the relay path to the another relay path. In some embodiments, the recovery procedure comprises switching from the relay path to a predetermined default relay path.

In some embodiments, the recovery procedure comprises changing at least one hop along the relay path that is associated with the at least one of the warning event and the failure event. In some embodiments, the recovery procedure comprises remapping at least one of a flow, a service, a radio link channel, a logical channel that is associated with the at least one of the warning event and the failure event on the relay path. In some embodiments, the recovery procedure comprises allocating additional resources to the relay path. In some embodiments, the recovery procedure to initiate as a result of the occurrence of the at least one event is configured via at least one of a system information signaling, a radio resource control, RRC, signaling, a medium access control, MAC, control element, CE, signaling and a down-link control information, DCI, signaling.

In some embodiments, the processing circuitry is config-ured to cause the node to determine the occurrence of the at least one event associated with the relay path by being configured to cause the node to determine the occurrence of at least one Quality-of-Service, QoS, requirement not being met on at least one hop in the relay path. In some embodi-ments, the processing circuitry is configured to cause the node to determine the occurrence of the at least one event associated with the relay path by being configured to cause the node to determine the occurrence of at least one radio channel quality indicator on at least one hop in the relay path is below a predetermined threshold.

In some embodiments, the processing circuitry is config-ured to cause the node to determine the occurrence of the at least one event associated with the relay path by being configured to cause the node to determine a number of retransmissions on at least one hop in the relay path reached a predetermined maximum number. In some embodiments, the processing circuitry is configured to cause the node to determine the occurrence of the at least one event associated with the relay path by being configured to cause the node to determine that a procedure on at least one hop in the relay path reached a predetermined maximum time delay before being completed.

In some embodiments, the processing circuitry is config-ured to cause the node to determine the occurrence of the at least one event associated with the relay path by being configured to cause the node to determine that a maximum number of non-acknowledgements, NACKs, reached a pre-determined maximum number. In some embodiments, the processing circuitry is configured to cause the node to determine the occurrence of the at least one event associated with the relay path by being configured to cause the node to determine that a maximum number of discontinuous trans-missions, DTXs, reached a predetermined maximum num-ber. In some embodiments, the processing circuitry is further configured to cause the node to receive a configuration to monitor for the occurrence of the at least one event associ-ated with the relay path via at least one of a radio resource control, RRC, signaling, a PC5-RRC signaling, a system information block signaling.

In some embodiments, the node is pre-configured to monitor for the occurrence of the at least one event associ-ated with the relay path. In some embodiments, the process-ing circuitry is further configured to cause the node to indicate a capability to monitor the relay path. In some embodiments, the node is one of a wireless device and a network node; and the second node is one of a destination node and a relay node on the relay path.

BRIEF DESCRIPTION OF THE DRAWINGS

A more complete understanding of the present embodi-ments, and the attendant advantages and features thereof, may be more readily understood by reference to the follow-ing detailed description when considered in conjunction with the accompanying drawings wherein:

FIG. 9 is a flowchart of an exemplary process in a network node according to some embodiments of the present disclo-sure;

DETAILED DESCRIPTION

Figure 1:
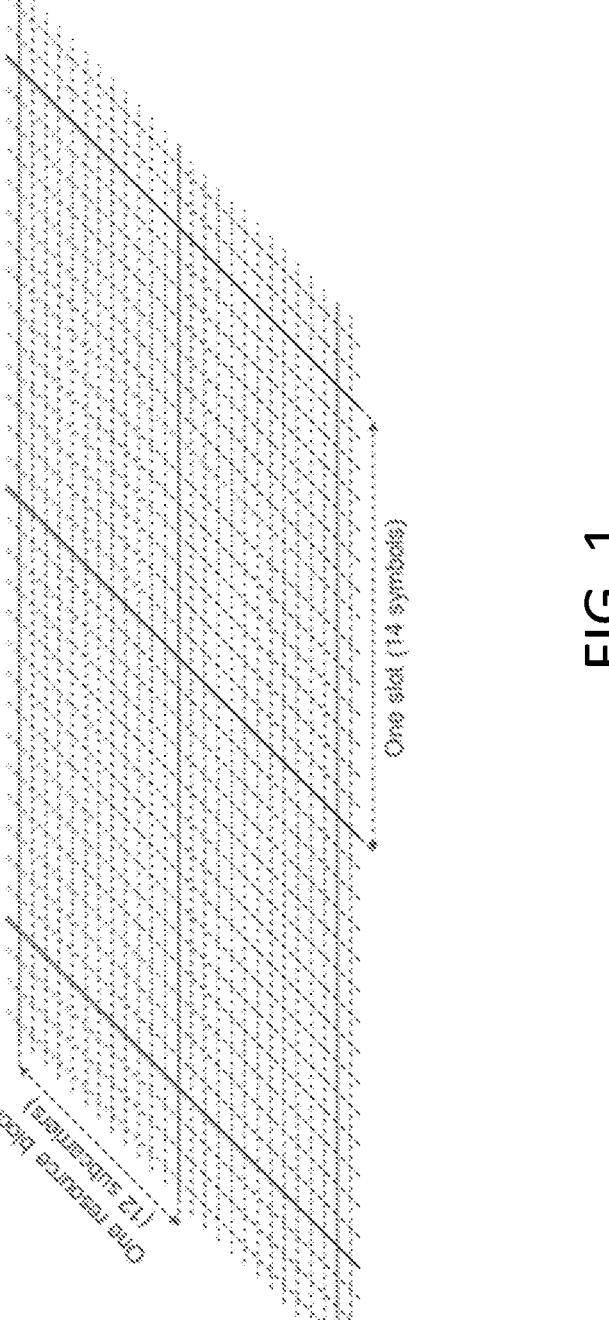
FIG. 1 illustrates an example NR physical resource grid.
Figure 2:
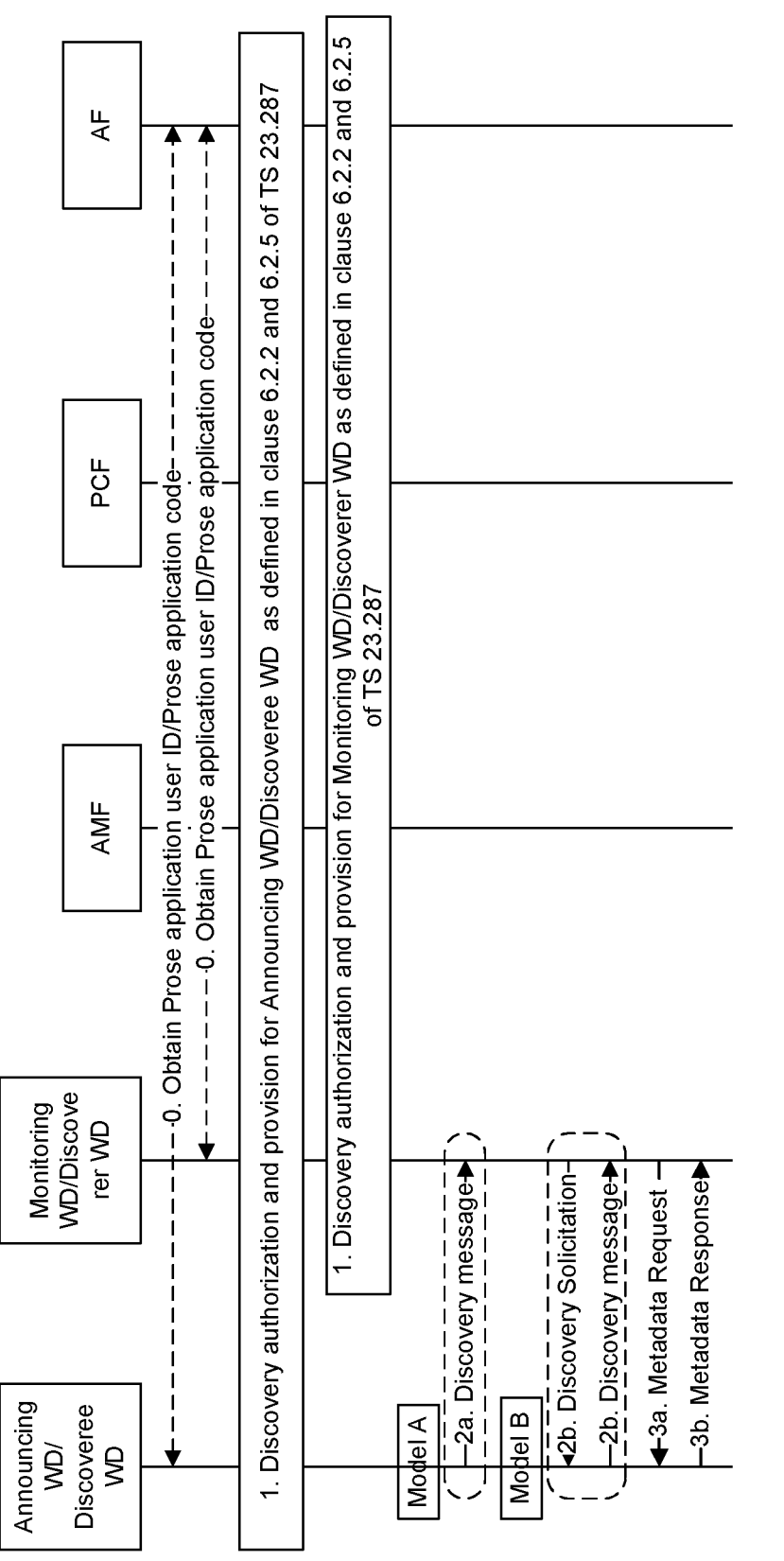
FIG. 2 illustrates an example of FIG. 6.1.2.2-1 (procedure for discovery procedure) in TS 23.752.

In the ongoing 3GPP Rel 17 study item (SI) on NR sidelink relay, the below objectives may be studied during 3GPP Rel 17 time frame.

This study item targets to study single-hop NR sidelink-based relay.

Study mechanism(s) with minimum specification impact to support the SA requirements for sidelink-based WD-to-network and WD-to-WD relay, focusing on the following aspects (if applicable) for layer-3 relay and layer-2 relay [RAN2];

NOTE 1: The study may take into account of further input from SA WGs, e.g., SA2 and SA3, for the bullets above (if applicable).

NOTE 2: It is assumed that WD-to-network relay and WD-to-WD relay use the same relaying solution.

NOTE 3: Forward compatibility for multi-hop relay support in a future release may be taken into account.

NOTE 3: Forward compatibility for multi-hop relay support in a future release may be taken into account.

According to the above study objectives, SL based WD-to-network (W2N, also called U2N) relay and WD to WD (W2 W, also called U2U) relay may be studied in the scope. The study may also consider forward compatibility, i.e., the solution may be easily extended to be applicable for multi-hop relay.

In the studied relay scenarios, a full path is to be maintained between a remote WD and a destination node. The path may contain multiple hops. If any of the hop occurs a failure event, the whole path may be broken, that would negatively affect the service or traffic which is being carried on the path. Therefore, a timely failure detection and recovery procedure would be beneficial to maintain the path and ensure QoS for the services which are being carried on the path.

In a first embodiment, a relay path contains one remote WD, and at least one relay node (i.e., WD or gNB). For a U2U relay, a destination remote WD may be also contained in the path. A monitoring procedure is defined for any node (e.g., WD, network node) on the path. The monitoring procedure is performed by the node for monitoring the path status. In case the path is in a normal status, no action is triggered, however, in case any abnormal status is detected, the monitoring node that detected the abnormal status sends a status message to other nodes on the path. A recovery action may be also triggered/initiated by the monitoring node (e.g., switching out one or more hops, etc.).

In a second embodiment, at least one of the below warning events may be defined for the monitoring procedure:

Pre-warning of a failure event;

Triggering of a failure event; and/or

Recovery of a failure event.

For any of the above events, the monitoring mode may also trigger a corresponding path status message.

In a third embodiment, a failure event may be defined for the path in terms of one of the below path performance indicators:

One or multiple QoS requirements on at least one hop for a service or traffic such as packet delay, bit rate, jitter, packet delay budget, mean opinion score (MOS), or any other QoS performance indicator are not met;

One or multiple radio channel quality indicators (e.g., reference signal received power (RSRP), reference signal received quality (RSRQ), signal-to-interference-plus-noise ratio (SINR), constant bitrate (CBR)) on at least one hop are below a configured threshold;

Retransmissions on at least one hop reach a maximum number;

A procedure on at least one hop has reached a maximum delay before it is completed; and/or Maximum number of discontinuous transmission/non-acknowledgement (DTX/NACK) has reached a maximum number.

In some embodiments of this solution, only restricted type of discovery is used.

In some embodiments of the present disclosure, the QoS metrics such as latency, power consumption and signaling overhead may be improved when performing the path (re) selection and/or reconfiguration procedure in the WD-to-NW and WD-to-WD relay scenarios, as compared to existing arrangements. Further, in certain cases, when a recovery procedure is possible, the interruption of the connectivity may be avoided (i.e., no need to release and re-establish the relay path) in some embodiments.

Some embodiments may be particularly useful when the requirements on public safety and vehicle-2-everything (V2X) use cases need to be met.

Before describing in detail exemplary embodiments, it is noted that the embodiments reside primarily in combinations of apparatus components and processing steps related to monitoring procedure for relay path scenarios. Accordingly, components have been represented where appropriate by conventional symbols in the drawings, showing only those specific details that are pertinent to understanding the embodiments so as not to obscure the disclosure with details that may be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It may be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art may appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "hop" may be used to indicate a link in a relay path from one node to another node in the relay path.

In some embodiments, the terms "relay path", "sidelink path", "communication path" and "path" may be used herein interchangeably.

Note that although terminology from one particular wireless system, such as, for example, 3GPP LTE and/or New Radio (NR), may be used in this disclosure, this may not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It may be further understood that terms used herein may be interpreted as having a meaning that is consistent with their meaning in the context of this specification and the relevant art and may not be interpreted in an idealized or overly formal sense unless expressly so defined herein.

Some embodiments provide monitoring procedure for relay path scenarios.

Figure 3:
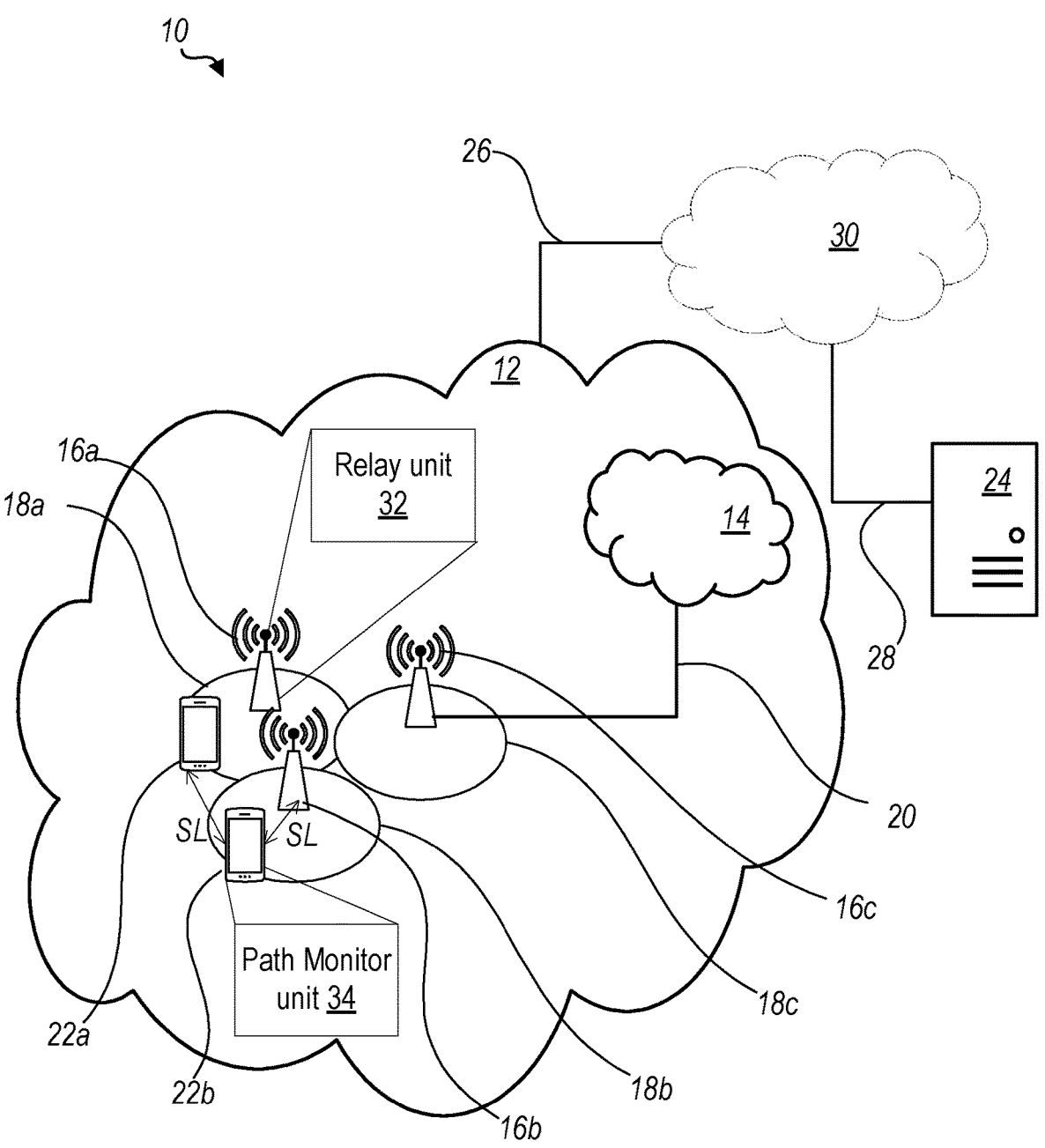
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a relay unit 32 which is configured to determine an occurrence of at least one characteristic associated with a relay path, the relay path including the node and the second node, and the at least one characteristic corresponding to at least one of a warning event and a failure event for the relay path; as a result of the determination, initiate performance of at least one action associated with the at least one of the warning event and the failure event.

A wireless device 22 is configured to include a path monitor unit 34 which is configured to receive a path status message from the second node in a relay path, the path status message being associated with an occurrence of at least one characteristic associated with the relay path, the relay path including the node and the second node, and the at least one characteristic corresponding to at least one of a warning event and a failure event for the relay path; and as a result of the path status message, initiate performance of at least one action associated with the at least one of the warning event and the failure event.

Example implementations, in accordance with an embodiment, of the WD 22, network node 16 and host computer 24 discussed in the preceding paragraphs may now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include relay unit 32 configured to perform node methods discussed herein, such as the methods discussed with reference to FIG. 9 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a path monitor (PM) unit 34 configured to perform node methods discussed herein, such as the methods discussed with reference to FIG. 10 as well as other figures.

Figure 4:
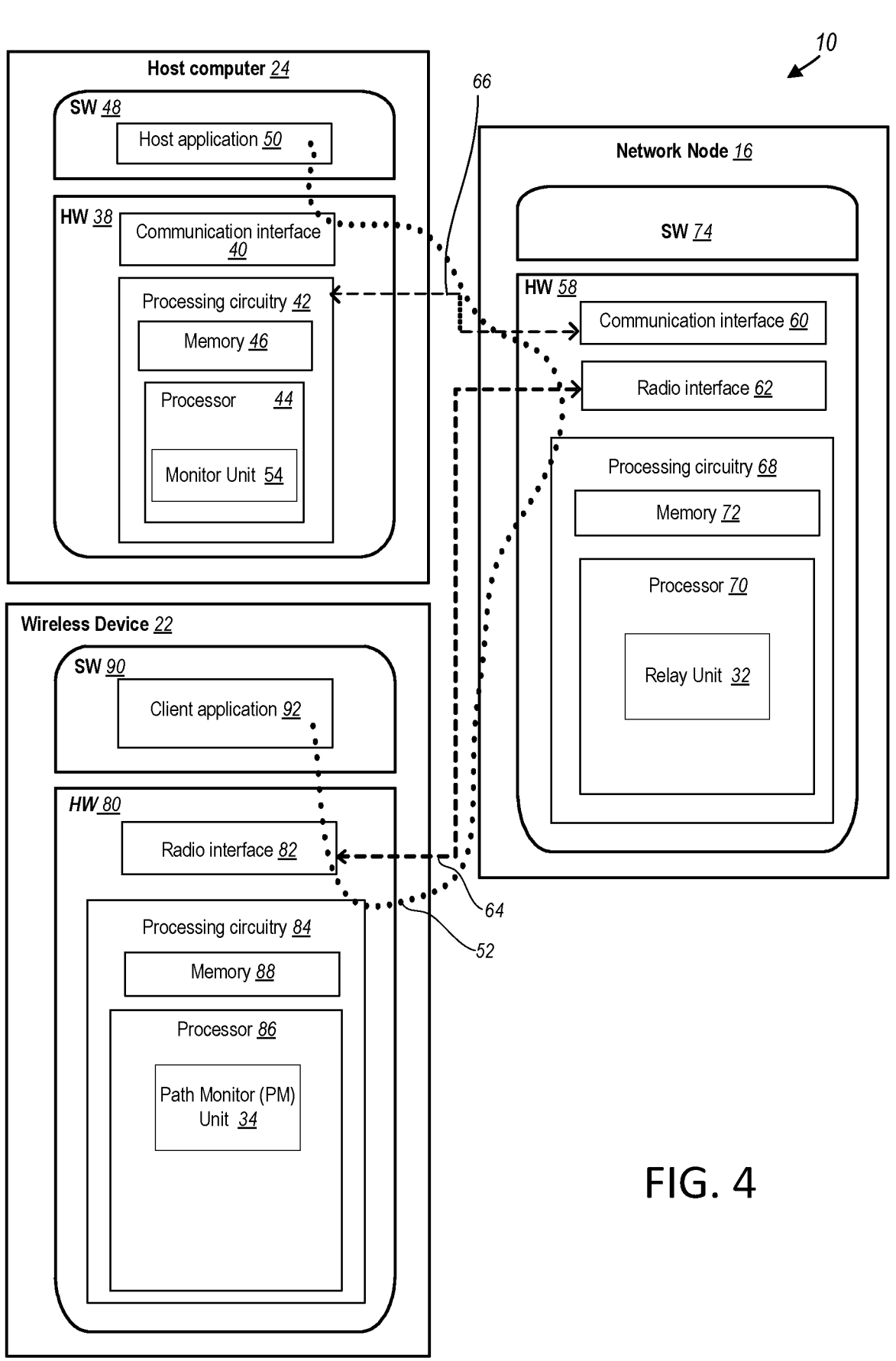
FIG. 4 is a block diagram of a host computer communi-cating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as relay unit 32, and PM unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Although FIGS. 3 and 4 show the relay unit 32 in a network node 16 and the path monitor (PM) unit 34 in a WD 22, it should be understood that, in some embodiments, there may be a relay unit 32 in the WD 22 and/or a PM unit 34 in the network node 16. In addition, in some embodiments, a single node, such as the network node 16 or WD 22 may include both the relay unit 32 and the PM unit 32 and may therefore e.g., relay information received from another node in some scenarios and in other scenarios may monitor and detect the characteristic/condition associated with the warning/failure event.

Figures 5, 6:
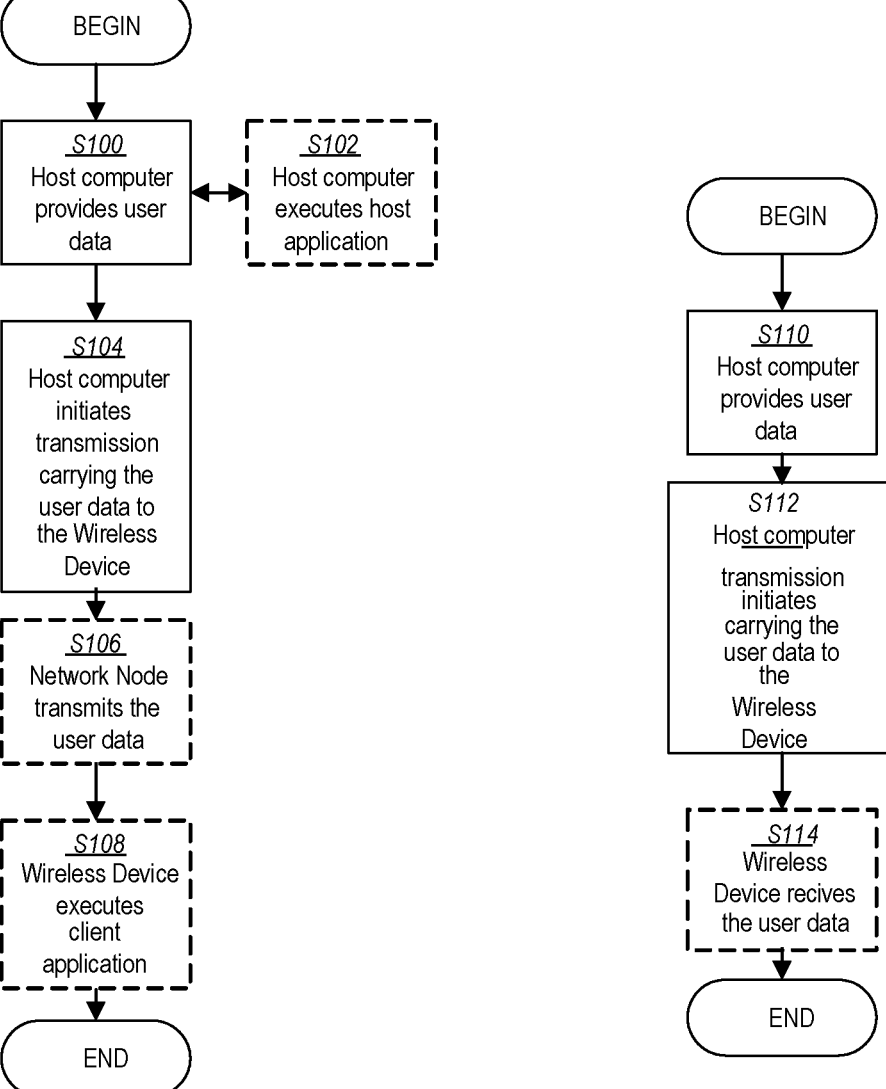
FIG. 5 is a flowchart illustrating exemplary methods implemented in a communication system including a host computer, a network node and a wireless device for execut-ing a client application at a wireless device according to some embodiments of the present disclosure.
FIG. 6 is a flowchart illustrating exemplary methods implemented in a communication system including a host computer, a network node and a wireless device for receiv-ing user data at a wireless device according to some embodi-ments of the present disclosure.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
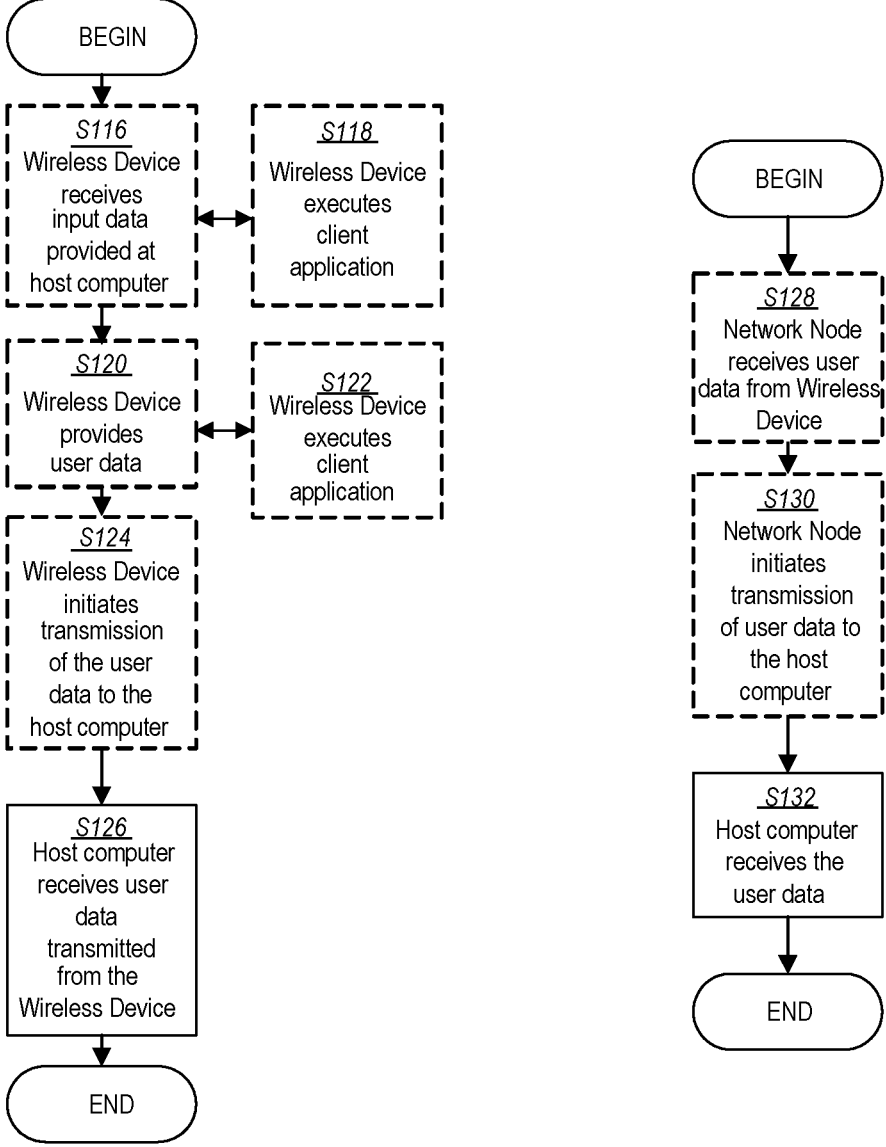
FIG. 7 is a flowchart illustrating exemplary methods implemented in a communication system including a host computer, a network node and a wireless device for receiv-ing user data from the wireless device at a host computer according to some embodiments of the present disclosure.
FIG. 8 is a flowchart illustrating exemplary methods implemented in a communication system including a host computer, a network node and a wireless device for receiv-ing user data at a host computer according to some embodi-ments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 9 is a flowchart of an exemplary process in a network node 16 according to some embodiments of the present disclosure. One or more Blocks and/or functions and/or methods performed by the network node 16 may be performed by one or more elements of network node 16 such as by relay unit 32 in processing circuitry 68, processor 70, radio interface 62, communication interface 69, etc. according to the example method. The example method includes receiving (Block S134), such as via relay unit 32, processing circuitry 68, processor 70, radio interface 62 and/or communication interface 69, a path status message from the second node in a relay path, the path status message being associated with an occurrence of at least one characteristic associated with the relay path, the relay path including the node and the second node, and the at least one characteristic corresponding to at least one of a warning event and a failure event for the relay path. The method includes as a result of the path status message, initiating (Block S136), such as via relay unit 32, processing circuitry 68, processor 70, radio interface 62 and/or communication interface 69, performance of at least one action associated with the at least one of the warning event and the failure event.

In some embodiments, the relay path includes at least one of a sidelink (SL) path, a wireless device-to-network relay path and a wireless device-to-wireless device relay path. In some embodiments, the node is one of a wireless device and a network node and/or the second node is at least one of a monitoring node and a relay node on the relay path. In some embodiments, the at least one action comprises at least one of: relaying, such as via relay unit 32, processing circuitry 68, processor 70, radio interface 62 and/or communication interface 69, the path status message to a third node in the relay path; and initiating, such as via relay unit 32, processing circuitry 68, processor 70, radio interface 62 and/or communication interface 69, at least one recovery procedure to avoid the at least one of the warning event and the failure event.

In some embodiments, the at least one characteristic corresponding to the at least one of the warning event and the failure event for the relay path comprises at least one of: at least one Quality-of-Service (QoS) requirement not being met on at least one hop in the relay path; at least one radio channel quality indicator on at least one hop in the relay path being below a predetermined threshold; a number of retransmissions on at least one hop in the relay path reaching a predetermined maximum number; a procedure on at least one hop in the relay path reaching a predetermined maximum time delay before being completed; and/or a maximum number of discontinuous transmission/non-acknowledgement (DTX/NACK) reaching a predetermined maximum number.

Figure 10:
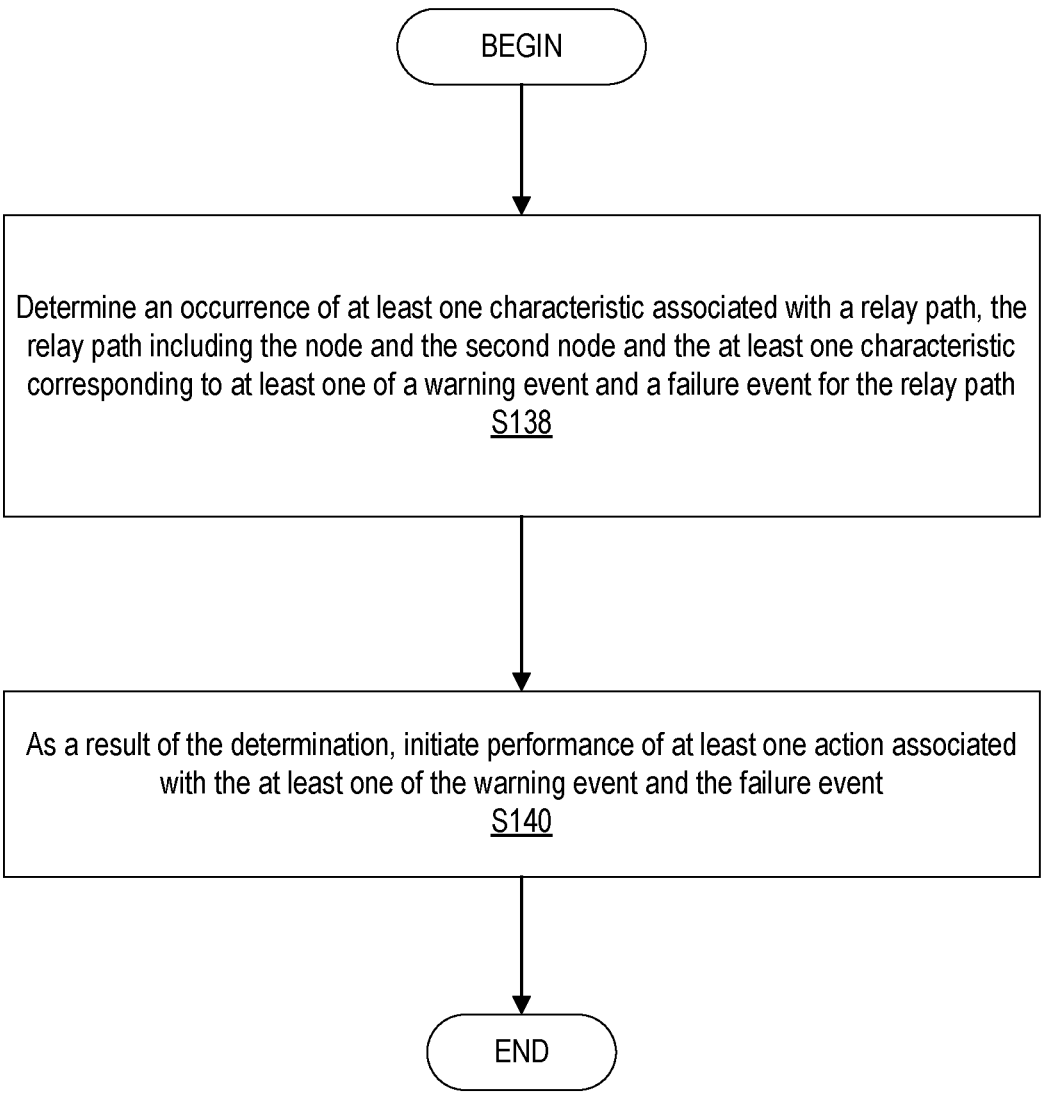
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions and/or methods performed by WD 22 may be performed by one or more elements of WD 22 such as by PM unit 34 in processing circuitry 84, processor 86, radio interface 82, etc. The example method includes determining (Block S138), such as via PM unit 34, processing circuitry 84, processor 86 and/or radio interface 82, an occurrence of at least one characteristic associated with a relay path, the relay path including the node and the second node, and the at least one characteristic corresponding to at least one of a warning event and a failure event for the relay path. The method includes as a result of the determination, initiating (Block S140), such as via PM unit 34, processing circuitry 84, processor 86 and/or radio interface 82, performance of at least one action associated with the at least one of the warning event and the failure event.

In some embodiments, the relay path includes at least one of a sidelink (SL) path, a wireless device-to-network relay path and a wireless device-to-wireless device relay path. In some embodiments, the node is a wireless device and/or the second node is at least one of a destination node and a relay node on the relay path. In some embodiments, the at least one action includes at least one of: sending, such as via PM unit 34, processing circuitry 84, processor 86 and/or radio interface 82, a path status message indicating at least one of: the at least one characteristic, a node identifier (ID), a failure/warning event ID, a hop ID, whether the failure/warning event is associated with relay traffic and at least one of a flow, resource block and a logical channel ID associated with the failure/warning event; and initiating, such as via PM unit 34, processing circuitry 84, processor 86 and/or radio interface 82, at least one recovery procedure to avoid the at least one of the warning event and the failure event.

In some embodiments, the at least one characteristic corresponding to the at least one of the warning event and the failure event for the relay path includes at least one of: at least one Quality-of-Service (QoS) requirement not being met on at least one hop in the relay path; at least one radio channel quality indicator on at least one hop in the relay path being below a predetermined threshold; a number of retransmissions on at least one hop in the relay path reaching a predetermined maximum number; a procedure on at least one hop in the relay path reaching a predetermined maximum time delay before being completed; and/or a maximum number of discontinuous transmission/non-acknowledgement (DTX/NACK) reaching a predetermined maximum number.

Figure 11:
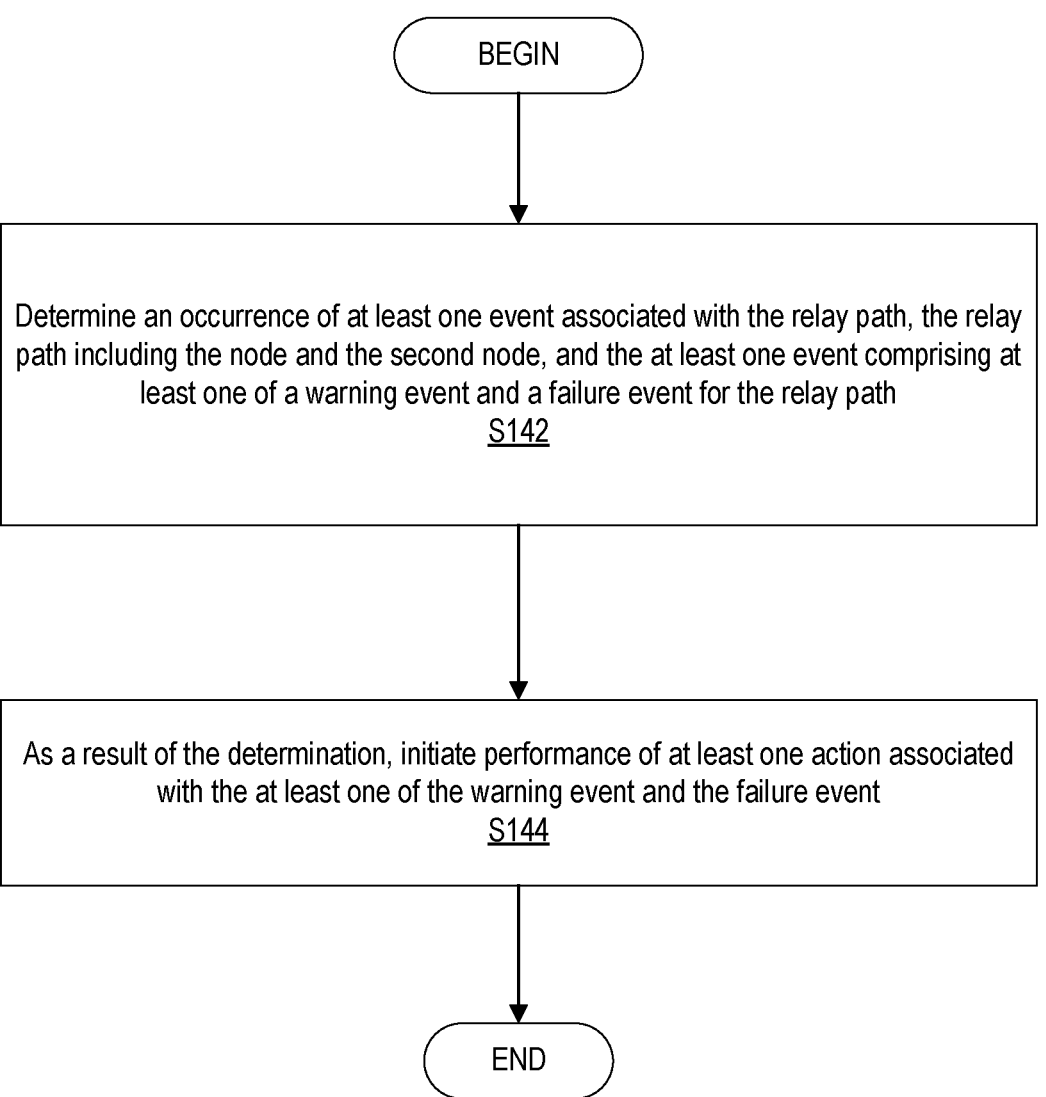
FIG. 11 is a flowchart of yet another example process in a node (e.g., wireless device and/or network node) according to some embodiments of the present disclosure.

FIG. 11 is a flowchart of an exemplary process in a node, such as, wireless device 22 and/or network node 16, according to some embodiments of the present disclosure. One or more Blocks and/or functions and/or methods performed by WD 22 and/or network node 16 may be performed by one or more elements of WD 22 such as by PM unit 34 in processing circuitry 84, processor 86, radio interface 82, and/or elements of network node 16 such as by relay unit 32 in processing circuitry 68, processor 70, radio interface 62, communication interface 69, etc. The example method includes determining (Block S142), such as by PM unit 34 in processing circuitry 84, processor 86, radio interface 82, relay unit 32 in processing circuitry 68, processor 70, radio interface 62 and/or communication interface 69, an occurrence of at least one event associated with the relay path, the relay path including the node and the second node, and the at least one event comprising at least one of a warning event and a failure event for the relay path. The method includes as a result of the determination, initiating (Block S144), such as by PM unit 34 in processing circuitry 84, processor 86, radio interface 82, relay unit 32 in processing circuitry 68, processor 70, radio interface 62 and/or communication interface 69, performance of at least one action associated with the at least one of the warning event and the failure event.

In some embodiments, the relay path comprises at least one of a sidelink, SL, path, a wireless device-to-network relay path and a wireless device-to-wireless device relay path. In some embodiments, the determining the occurrence of the at least one event associated with the relay path comprises at least one of: (i) detecting, such as by PM unit 34 in processing circuitry 84, processor 86, radio interface 82, relay unit 32 in processing circuitry 68, processor 70, radio interface 62 and/or communication interface 69, the occurrence of the at least one event on the relay path; and (ii) receiving, such as by PM unit 34 in processing circuitry 84, processor 86, radio interface 82, relay unit 32 in processing circuitry 68, processor 70, radio interface 62 and/or communication interface 69, a path status message indicating the occurrence of the at least one event on the relay path.

In some embodiments, the initiating the performance of the at least one action comprises sending, such as by PM unit 34 in processing circuitry 84, processor 86, radio interface 82, relay unit 32 in processing circuitry 68, processor 70, radio interface 62 and/or communication interface 69, a path status message indicating the occurrence of the at least one event on the relay path. In some embodiments, the path status message indicates the occurrence of the at least one event on a single hop of the relay path. In some embodiments, the path status message indicates the occurrence of the at least one event on all hops along the relay path and the path status message further comprises an indication to forward the path status message along all nodes in the relay path.

In some embodiments, the path status message comprising at least one of: a node identifier, ID, an event ID, a hop ID, whether the event is associated with a relay traffic, a flow ID associated with the event, a radio bearer associated with the event and a logical channel ID associated with the event. In some embodiments, the initiating the performance of the at least one action comprises initiating, such as by PM unit 34 in processing circuitry 84, processor 86, radio interface 82, relay unit 32 in processing circuitry 68, processor 70, radio interface 62 and/or communication interface 69, a recovery procedure to avoid the at least one of the warning event and the failure event. In some embodiments, the recovery procedure comprises releasing the relay path.

In some embodiments, the recovery procedure comprises selecting another relay path and switching from the relay path to the another relay path. In some embodiments, the recovery procedure comprises switching, such as by PM unit 34 in processing circuitry 84, processor 86, radio interface 82, relay unit 32 in processing circuitry 68, processor 70, radio interface 62 and/or communication interface 69, from the relay path to a predetermined default relay path. In some embodiments, the recovery procedure comprises changing, such as by PM unit 34 in processing circuitry 84, processor 86, radio interface 82, relay unit 32 in processing circuitry 68, processor 70, radio interface 62 and/or communication interface 69, at least one hop along the relay path that is associated with the at least one of the warning event and the failure event.

In some embodiments, the recovery procedure comprises remapping, such as by PM unit 34 in processing circuitry 84, processor 86, radio interface 82, relay unit 32 in processing circuitry 68, processor 70, radio interface 62 and/or communication interface 69, at least one of a flow, a service, a radio link channel, a logical channel that is associated with the at least one of the warning event and the failure event on the relay path. In some embodiments, the recovery procedure comprises allocating additional resources to the relay path. In some embodiments, the recovery procedure to initiate as a result of the occurrence of the at least one event is configured via at least one of a system information signaling, a radio resource control, RRC, signaling, a medium access control, MAC, control element, CE, signaling and a downlink control information, DCI, signaling.

In some embodiments, the determining the occurrence of the at least one event associated with the relay path comprises determining, such as by PM unit 34 in processing circuitry 84, processor 86, radio interface 82, relay unit 32 in processing circuitry 68, processor 70, radio interface 62 and/or communication interface 69, the occurrence of at least one Quality-of-Service, QoS, requirement not being met on at least one hop in the relay path. In some embodiments, the determining the occurrence of the at least one event associated with the relay path comprises determining, such as by PM unit 34 in processing circuitry 84, processor 86, radio interface 82, relay unit 32 in processing circuitry 68, processor 70, radio interface 62 and/or communication interface 69, that at least one radio channel quality indicator on at least one hop in the relay path is below a predetermined threshold.

In some embodiments, the determining the occurrence of the at least one event associated with the relay path comprises determining, such as by PM unit 34 in processing circuitry 84, processor 86, radio interface 82, relay unit 32 in processing circuitry 68, processor 70, radio interface 62 and/or communication interface 69, that a number of retransmissions on at least one hop in the relay path reached a predetermined maximum number. In some embodiments, the determining the occurrence of the at least one event associated with the relay path comprises determining, such as by PM unit 34 in processing circuitry 84, processor 86, radio interface 82, relay unit 32 in processing circuitry 68, processor 70, radio interface 62 and/or communication interface 69, that a procedure on at least one hop in the relay path reached a predetermined maximum time delay before being completed.

In some embodiments, the determining the occurrence of the at least one event associated with the relay path comprises determining, such as by PM unit 34 in processing circuitry 84, processor 86, radio interface 82, relay unit 32 in processing circuitry 68, processor 70, radio interface 62 and/or communication interface 69, that a maximum number of non-acknowledgements, NACKs, reached a predetermined maximum number. In some embodiments, the determining the occurrence of the at least one event associated with the relay path comprises determining, such as by PM unit 34 in processing circuitry 84, processor 86, radio interface 82, relay unit 32 in processing circuitry 68, processor 70, radio interface 62 and/or communication interface 69, that a maximum number of discontinuous transmissions, DTXs, reached a predetermined maximum number.

In some embodiments, the method further includes receiving, such as by PM unit 34 in processing circuitry 84, processor 86, radio interface 82, relay unit 32 in processing circuitry 68, processor 70, radio interface 62 and/or communication interface 69, a configuration to monitor for the occurrence of the at least one event associated with the relay path via at least one of a radio resource control, RRC, signaling, a PC5-RRC signaling, a system information block signaling. In some embodiments, the node is pre-configured to monitor for the occurrence of the at least one event associated with the relay path. In some embodiments, the method further includes indicating, such as by PM unit 34 in processing circuitry 84, processor 86, radio interface 82, relay unit 32 in processing circuitry 68, processor 70, radio interface 62 and/or communication interface 69, a capability to monitor the relay path. In some embodiments, the node is one of a wireless device and a network node; and the second node is one of a destination node and a relay node on the relay path.

Having described the general process flow of arrangements of the disclosure and having provided examples of hardware and software arrangements for implementing the processes and functions of the disclosure, the sections below provide details and examples of arrangements for monitoring procedures for relay path scenarios, which may be implemented by the network node 16, wireless device 22 and/or host computer 24.

Some embodiments of the present disclosure are described in the context of NR, i.e., a remote WD 22 and a relay WD 22 are deployed in the same or a different NR cell. The embodiments are also applicable to other relay scenarios including WD 22 to network (U2N) relay or WD 22 to WD 22 (U2U) relay where the link between remote WD 22 and relay WD 22 may be based on LTE sidelink or NR sidelink, the Uu connection between relay WD 22 and base station may be LTE Uu or NR Uu. A relay scenario containing multiple relay hops may also be covered. The connection between remote WD 22 and relay WD 22 is also not limited to sidelink. Any short-range communication technology such as Wi-Fi may be equally applicable.

Some embodiments are also applicable to a relay scenario where the relay WD 22 is configured with multiple connections (i.e., the number of connections is equal or larger than two) to the RAN (e.g., network node 16) (e.g., dual connectivity, carrier aggregation, etc.).

Some embodiments are applicable to both L2 relay and L3 relay-based relay scenarios.

In the first embodiment, a relay path contains one remote WD 22, and at least one relay node (i.e., WD 22 or network node 16). For a U2U relay, the destination/remote node is represented by a destination/remote WD 22 that may be also contained in the path. For the U2N relay, the destination node is represented by a network node 16 (e.g., gNB) that may eventually perform monitoring on the Uu path with the relay WD 22. A monitoring procedure may be defined for any node on the path. The monitoring procedure may be performed by a node of the path for monitoring the path status on a single hop or on the overall path. In case the path is in a normal status, no action may be triggered, however, in case an abnormal status is detected, the monitoring node sends a status message to other nodes on the path. A recovery action may be also triggered by the monitoring node or any other node that is in the path (e.g., the gNB or destination remote WD 22).

In the second embodiment, at least one of the below warning events is defined for the monitoring procedure.

Pre-warning of a failure event;

Triggering of a failure event; and/or

Recovery of a failure event.

For any of the above events, the monitoring node may also trigger a corresponding path status message.

In particular, in some embodiments, the monitoring node (e.g., WD 22, network node 16), upon detecting an abnormal situation over the relay path (on one hop or over the overall path) may determine to send a pre-waring failure indication to its peer WD 22 (e.g., the relay WD 22 or the destination node of the path) if the relay path is not failed yet but its condition is going to get worse soon (i.e., meaning that the connection may be soon lost). Further, the monitor node (e.g., WD 22, network node 16), if an abnormal situation is detected, may send an indication of a failure (i.e., triggering of a failure event) to its peer WD 22 (e.g., the relay WD 22 or the destination node of the path) if an action is expected by the node receiving such indication. Alternatively, when detecting an abnormal situation, the monitoring node may trigger one or more recovery actions and may inform all the nodes along the relay path about the recovery action decided (e.g., release the relay path or perform a relay WD 22 change).

In some embodiments, the monitoring WD 22 may determine to trigger a path status message (including one of more of the warning events described above) for one or more specific hops of the relay path or for all hops in the path. In case the actions are hop specific, the path status message may only be sent to the peer WD 22 (e.g., a relay WD 22, a network node 16, or the destination/remote WD 22) with which the path is established. Alternatively, if the actions are for all the hops in the relay path, the path status message may be sent (e.g., by the monitoring WD 22) to all the nodes belonging to the affected path. This last alternative may imply that the path status message may be sent along with an indication that this same message may be further forwarded to all the reachable nodes (e.g., WD 22, network node 16) of the relay path.

In the third embodiment, a failure event may be defined for the path in terms of one of the below path performance indicators:

One or multiple QoS requirements on at least one hop for a service or traffic such as packet delay, bit rate, jitter, packet delay budget, mean opinion score (MOS), or any other QoS performance indicators are not met;

One or multiple radio channel quality indicators (e.g., RSRP, RSRQ, SINR, CBR) on at least one hop are below (or do not at least meet) a configured threshold;

Retransmissions on at least one hop reach a maximum (e.g., predetermined or configured) number;

A procedure on at least one hop has reached a maximum (e.g., predetermined or configured) delay before it is completed; and/or A maximum number of DTX/NACK has reached a maximum (e.g., predetermined or configured) number.

In the fourth embodiment, a failure event on a hop may be distributed to other nodes along the path via a status report message. The message can be carried via, for example, radio resource control (RRC) signaling, PC5-S signaling or medium access control-control element (MAC-CE) and distributed along the path. Alternatively, the message can be carried via control protocol data units (PDUs) of a protocol layer such as packet data convergence protocol (PDCP), radio link control (RLC), or adaption layer. The message may also indicate at least one of the below information:

1) WD IDs associated with the failure event, WD IDs could be remote WD IDs, and/or relay WD IDs, etc.

2) Flow/resource block (RB)/logical channel (LCH) ID associated with the failure event;

3) Failure event indicator;

4) Hop/link ID associated with the measurement results; and/or

5) Indicator on whether the failure is associated with the relay traffic.

In the fifth embodiment, the monitoring procedure can be configured for one single node (e.g., WD 22, network node 16) in the relay path, for all the nodes in the relay path, or for some of the nodes in the relay path. The monitoring procedure itself and the actions to be performed when an abnormal situation is detected or determined may be configured via, for example, dedicated Uu RRC signaling, PC5-RRC signaling, broadcasted (e.g., in system information block (SIB)), or pre-configured (i.e., fixed in a specification).

In the sixth embodiment, if a node (e.g., WD 22, network node 16) that belong to the relay path receives a path status message, including one (or more) warning events, from a monitoring WD 22, this node may determine to trigger a specific action only for that specific path where the abnormal situation has been detected. When a specific action is triggered for that specific path (where the abnormal situation has been detected) the node sends a message, indicating the actions to be performed, to the monitoring WD 22 from which the warning message has been received. If the node receiving the warning message determines to trigger a recovery procedure for all nodes in the relay path, then a message containing or otherwise indicating the actions to be performed may be sent to all the nodes in the path (e.g., WD 22, network node 16) included in the relay path (this may imply that a node may just "relay" the actions received to the its peer WDs 22 belonging to the relay path).

In the seventh embodiment, upon detection of a failure event or reception of a status report message indicating a failure event on the path or hop (the failure event could be a pre-warning event or occurrence of a failure event), a node (e.g., WD 22, network node 16) on the path may take at least one of the below recovery actions:

1) A path reselection to switch to another path;
2) Fallback the path where the failure events are detected to a backup or default path;
3) Change the hops or the path segment where the failure events are detected, with new hops or new path segment;
4) Remapping the flows/services/RLC channels/logical channels on the path where the failure events are detected to different paths; and/or
5) Assigning one or more resources to the path where the failure events are detected.

In the eighth embodiment, which recovery action the remote WD 22 and/or relay WD 22 may apply is configured by the network node 16 (e.g., gNB) via e.g., system information, RRC signaling, MAC CE or downlink control information (DCI).

In the ninth embodiment, a WD 22 capability is defined for a WD 22 to indicate whether the WD 22 supports monitoring of a path (i.e., this may be related to relay scenarios or not).

Any two or more of the embodiments discussed herein may be combined.

Some embodiments may include one or more of the following:

The node may be a network node and/or a WD.

Embodiment A1. A node configured to communicate with a second node, the node configured to, and/or comprising a radio interface and/or comprising processing circuitry configured to:

determine an occurrence of at least one characteristic associated with a relay path, the relay path including the node and the second node, and the at least one characteristic corresponding to at least one of a warning event and a failure event for the relay path;

as a result of the determination, initiate performance of at least one action associated with the at least one of the warning event and the failure event.

Embodiment A2. The node of Embodiment A1, wherein the relay path comprises at least one of a sidelink (SL) path, a wireless device-to-network relay path and a wireless device-to-wireless device relay path.

Embodiment A3. The node of any one of Embodiments A1 and A2, wherein the node is a wireless device and/or the second node is at least one of a destination node and a relay node on the relay path.

Embodiment A4. The node of any one of Embodiments A1-A3, wherein the at least one action comprises at least one of:

sending a path status message indicating at least one of: the at least one characteristic, a node identifier (ID), a failure/warning event ID, a hop ID, whether the failure/warning event is associated with relay traffic and at least one of a flow, resource block and a logical channel ID associated with the failure/warning event; and initiating at least one recovery procedure to avoid the at least one of the warning event and the failure event.

Embodiment A5. The node of any one of Embodiments A1-A4, wherein the at least one characteristic corresponding to the at least one of the warning event and the failure event for the relay path comprises at least one of:

at least one Quality-of-Service (QoS) requirement not being met on at least one hop in the relay path;

at least one radio channel quality indicator on at least one hop in the relay path being below a predetermined threshold;

a number of retransmissions on at least one hop in the relay path reaching a predetermined maximum number;

a procedure on at least one hop in the relay path reaching a predetermined maximum time delay before being completed; and/or a maximum number of discontinuous transmission/non-acknowledgement (DTX/NACK) reaching a predetermined maximum number.

Embodiment B1. A method implemented in a node, the method comprising:

determining an occurrence of at least one characteristic associated with a relay path, the relay path including the node and the second node, and the at least one characteristic corresponding to at least one of a warning event and a failure event for the relay path;

as a result of the determination, initiating performance of at least one action associated with the at least one of the warning event and the failure event.

Embodiment B2. The method of Embodiment B1, wherein the relay path comprises at least one of a sidelink (SL) path, a wireless device-to-network relay path and a wireless device-to-wireless device relay path.

Embodiment B3. The method of any one of Embodiments B1 and B2, wherein the node is a wireless device and/or the second node is at least one of a destination node and a relay node on the relay path.

Embodiment B4. The method of any one of Embodiments B1-B3, wherein the at least one action comprises at least one of:

sending a path status message indicating at least one of: the at least one characteristic, a node identifier (ID), a failure/warning event ID, a hop ID, whether the failure/warning event is associated with relay traffic and at least one of a flow, resource block and a logical channel ID associated with the failure/warning event; and initiating at least one recovery procedure to avoid the at least one of the warning event and the failure event.

Embodiment B5. The method of any one of Embodiments B1-B4, wherein the at least one characteristic corresponding to the at least one of the warning event and the failure event for the relay path comprises at least one of:

at least one Quality-of-Service (QoS) requirement not being met on at least one hop in the relay path;

at least one radio channel quality indicator on at least one hop in the relay path being below a predetermined threshold;

a number of retransmissions on at least one hop in the relay path reaching a predetermined maximum number;

a procedure on at least one hop in the relay path reaching a predetermined maximum time delay before being completed; and/or a maximum number of discontinuous transmission/non-acknowledgement (DTX/NACK) reaching a predetermined maximum number.

Embodiment C1. A node configured to communicate with a second node, the WD configured to, and/or comprising a radio interface and/or processing circuitry configured to:

receive a path status message from the second node in a relay path, the path status message being associated with an occurrence of at least one characteristic associated with the relay path, the relay path including the node and the second node, and the at least one characteristic corresponding to at least one of a warning event and a failure event for the relay path; and as a result of the path status message, initiate performance of at least one action associated with the at least one of the warning event and the failure event.

Embodiment C2. The node of Embodiment C1, wherein the relay path comprises at least one of a sidelink (SL) path, a wireless device-to-network relay path and a wireless device-to-wireless device relay path.

Embodiment C3. The node of any one of Embodiments C1 and C2, wherein the node is one of a wireless device and a network node and/or the second node is at least one of a monitoring node and a relay node on the relay path.

Embodiment C4. The node of any one of Embodiments C1-C3, wherein the at least one action comprises at least one of:

relaying the path status message to a third node in the relay path; and initiating at least one recovery procedure to avoid the at least one of the warning event and the failure event.

Embodiment C5. The node of any one of Embodiments C1-C4, wherein the at least one characteristic corresponding to the at least one of the warning event and the failure event for the relay path comprises at least one of:

at least one Quality-of-Service (QoS) requirement not being met on at least one hop in the relay path;

at least one radio channel quality indicator on at least one hop in the relay path being below a predetermined threshold;

a number of retransmissions on at least one hop in the relay path reaching a predetermined maximum number;

a procedure on at least one hop in the relay path reaching a predetermined maximum time delay before being completed; and/or a maximum number of discontinuous transmission/non-acknowledgement (DTX/NACK) reaching a predetermined maximum number.

Embodiment D1. A method implemented in a node, the method comprising:

receiving a path status message from the second node in a relay path, the path status message being associated with an occurrence of at least one characteristic associated with the relay path, the relay path including the node and the second node, and the at least one characteristic corresponding to at least one of a warning event and a failure event for the relay path; and as a result of the path status message, initiating performance of at least one action associated with the at least one of the warning event and the failure event.

Embodiment D2. The method of Embodiment D1, wherein the relay path comprises at least one of a sidelink (SL) path, a wireless device-to-network relay path and a wireless device-to-wireless device relay path.

Embodiment D3. The method of any one of Embodiments D1 and D2, wherein the node is one of a wireless device and a network node and/or the second node is at least one of a monitoring node and a relay node on the relay path.

Embodiment D4. The method of any one of Embodiments D1-D3, wherein the at least one action comprises at least one of:

relaying the path status message to a third node in the relay path; and initiating at least one recovery procedure to avoid the at least one of the warning event and the failure event.

Embodiment D5. The method of any one of Embodiments D1-D4, wherein the at least one characteristic corresponding to the at least one of the warning event and the failure event for the relay path comprises at least one of:

at least one Quality-of-Service (QoS) requirement not being met on at least one hop in the relay path;

at least one radio channel quality indicator on at least one hop in the relay path being below a predetermined threshold;

a number of retransmissions on at least one hop in the relay path reaching a predetermined maximum number;

a procedure on at least one hop in the relay path reaching a predetermined maximum time delay before being completed; and/or a maximum number of discontinuous transmission/non-acknowledgement (DTX/NACK) reaching a predetermined maximum number.

As may be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It may be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It may be understood that it would be unduly repetitious and obfuscating to literally describe and illustrate every combination and subcombination of these embodiments. Accordingly, all embodiments can be combined in any way and/or combination, and the present specification, including the drawings, may be construed to constitute a complete written description of all combinations and subcombinations of the embodiments described herein, and of the manner and process of making and using them, and may support claims to any such combination or subcombination.

Abbreviations that may be used in the preceding description include:

| Abbreviation | Explanation |
| --- | --- |
| CA | Carrier Aggregation |
| CBR | Channel Busy Ratio |
| CQI | Channel Quality Indicator |
| CSI | Channel State Information |
| DFN | Direct Frame Number |
| DL | Downlink |
| DRX | Discontinuous Reception |
| FDD | Frequency Division Duplex |
| GNSS | Global Navigation Satellite System |
| HARQ | Hybrid automatic repeat request |
| IE | Information Element |
| MAC | Medium Access Control |
| MIB | Master Information Block |
| NSPS | National Security and Public Safety |
| NW | Network |
| OoC | Out-of-Coverage |
| PDCCH | Physical Downlink Control Channel |
| PDCP | Packet Data Convergence Protocol |
| PDU | Protocol Data Unit |
| PHY | Physical (layer) |
| PL | Path Loss |
| PMI | Precoding Matrix Indicator |
| ProSe | Proximity Services |
| PSCCH | Physical Sidelink Control Channel |
| PSSCH | Physical Sidelink Shared Channel |
| QoS | Quality of Service |
| RL | Relay |
| RLC | Radio link control |
| RM | Remote |
| RI | Rank Indicator |
| RRC | Radio Resource Control |
| RSRP | Reference Signal Received Power |
| RSSI | Received Signal Strength Indicator |
| RX | Receive, receiver |

-continued

| Abbreviation | Explanation |
| --- | --- |
| SFN | System Frame Number |
| SIB | System Information Block |
| SINR | Signal to interference noise ration |
| SL | Sidelink |
| SLRB | Sidelink Radio Bearer |
| SLSS | Sidelink Synchronization Signals |
| SynchUE | Synchronization UE |
| TDD | Time Division Duplex |
| TETRA | Terrestrial Trunked Radio |
| TX | Transmit, transmitter |
| UE | User Equipment |
| UL | Uplink |
| V2V | Vehicle-to-vehicle |
| V2X | Vehicle-to-anything |

It may be appreciated by persons skilled in the art that the embodiments described herein are not limited to what has been particularly shown and described herein above. In addition, unless mention was made above to the contrary, it may be noted that all of the accompanying drawings are not to scale. A variety of modifications and variations are possible in light of the above teachings without departing from the scope of the following claims.

What is claimed is:

1. A method implemented in a node configured to communicate with a second node over a relay path, the method comprising:

determining an occurrence of at least one event associated with the relay path, the relay path including the node and the second node, and the at least one event comprising at least one of a warning event and a failure event for the relay path; and as a result of the determination, initiating performance of at least one action associated with the at least one of the warning event and the failure event, wherein the initiating the performance of the at least one action comprises sending a path status message indicating the occurrence of the at least one event on the relay path, and wherein the path status message comprises an indication to forward the path status message along all nodes in the relay path.

2. The method of claim 1, wherein the relay path comprises at least one of a sidelink (SL) path, a wireless device-to-network relay path and a wireless device-to-wireless device relay path.

3. The method of claim 1, wherein the determining the occurrence of the at least one event associated with the relay path comprises at least one of: (i) detecting the occurrence of the at least one event on the relay path; and (ii) receiving a path status message indicating the occurrence of the at least one event on the relay path.

4. The method of claim 1, wherein the path status message indicates the occurrence of the at least one event on a single hop of the relay path.

5. The method of claim 1, wherein the path status message indicates the occurrence of the at least one event on all hops along the relay path.

6. The method of claim 1, wherein the path status message comprising at least one of: a node identifier (ID), an event ID, a hop ID, whether the event is associated with a relay traffic, a flow ID associated with the event, a radio bearer associated with the event and a logical channel ID associated with the event.

7. The method of claim 1, wherein the initiating the performance of the at least one action comprises initiating a recovery procedure to avoid the at least one of the warning event and the failure event.

8. The method of claim 7, wherein the recovery procedure comprises releasing the relay path.

9. The method of claim 7, wherein the recovery procedure comprises selecting another relay path and switching from the relay path to the another relay path.

10. The method of claim 7, wherein the recovery procedure comprises switching from the relay path to a predetermined default relay path.

11. The method of claim 7, wherein the recovery procedure comprises changing at least one hop along the relay path that is associated with the at least one of the warning event and the failure event.

12. The method of claim 7, wherein the recovery procedure comprises remapping at least one of a flow, a service, a radio link channel, a logical channel that is associated with the at least one of the warning event and the failure event on the relay path.

13. The method of claim 7, wherein the recovery procedure comprises allocating additional resources to the relay path.

14. The method of claim 7, wherein the recovery procedure to initiate as a result of the occurrence of the at least one event is configured via at least one of a system information signaling, a radio resource control (RRC) signaling, a medium access control (MAC) control element (CE) signaling and a downlink control information (DCI) signaling.

15. The method of claim 1, wherein the determining the occurrence of the at least one event associated with the relay path comprises determining the occurrence of at least one Quality-of-Service (QoS) requirement not being met on at least one hop in the relay path.

16. The method of claim 1, wherein the determining the occurrence of the at least one event associated with the relay path comprises determining that at least one radio channel quality indicator on at least one hop in the relay path is below a predetermined threshold.

17. The method of claim 1, wherein the determining the occurrence of the at least one event associated with the relay path comprises determining that a number of retransmissions on at least one hop in the relay path reached a predetermined maximum number.

18. The method of claim 1, wherein the determining the occurrence of the at least one event associated with the relay path comprises determining that a procedure on at least one hop in the relay path reached a predetermined maximum time delay before being completed.

19. A node configured to communicate with a second node over a relay path, the node comprising processing circuitry, the processing circuitry configured to cause the node to:

determine an occurrence of at least one event associated with the relay path, the relay path including the node and the second node, and the at least one event comprising at least one of a warning event and a failure event for the relay path; and as a result of the determination, initiate performance of at least one action associated with the at least one of the warning event and the failure event, wherein the initiating the performance of the at least one action comprises sending a path status message indicating the occurrence of the at least one event on the relay path, and wherein the path status message comprises an indication to forward the path status message along all nodes in the relay path.

* * * * *